(12) United States Patent
Kirner et al.

(10) Patent No.: US 10,148,511 B2
(45) Date of Patent: *Dec. 4, 2018

(54) MANAGING SERVERS BASED ON PAIRING KEYS TO IMPLEMENT AN ADMINISTRATIVE DOMAIN-WIDE POLICY

(71) Applicant: Illumio, Inc., Sunnyvale, CA (US)

(72) Inventors: Paul J. Kirner, Palo Alto, CA (US); Daniel R. Cook, San Jose, CA (US); Matthew K. Glenn, Mountain View, CA (US); Mukesh Gupta, Milpitas, CA (US); Jerry B. Scott, Los Altos, CA (US); Thukalan V. Verghese, San Carlos, CA (US)

(73) Assignee: Illumio, Inc., Sunnyvale, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 15/204,067

(22) Filed: Jul. 7, 2016

(65) Prior Publication Data

US 2016/0315934 A1 Oct. 27, 2016

Related U.S. Application Data

(63) Continuation of application No. 14/527,372, filed on Oct. 29, 2014, now Pat. No. 9,397,892.
(Continued)

(51) Int. Cl.
*H04L 12/24* (2006.01)
*H04L 29/06* (2006.01)
(Continued)

(52) U.S. Cl.
CPC ........ *H04L 41/0893* (2013.01); *H04L 9/0643* (2013.01); *H04L 41/0869* (2013.01);
(Continued)

(58) Field of Classification Search
CPC .................................................. H04L 41/0893
See application file for complete search history.

(56) References Cited

U.S. PATENT DOCUMENTS 6,023,765 A 2/2000 Kuhn
7,418,490 B1 8/2008 Zhang et al.
(Continued)

FOREIGN PATENT DOCUMENTS

EP 1119151 A2 7/2001
TW 200539615 12/2005
(Continued)

OTHER PUBLICATIONS

Extended European Search Report for European Patent Application No. EP 14859265.2, dated Mar. 30, 2017, 10 Pages.
(Continued)

*Primary Examiner* — Kambiz Zand
*Assistant Examiner* — Thanh H Le
(74) *Attorney, Agent, or Firm* — Fenwick & West LLP (57) ABSTRACT

A server is paired. A pairing request that includes a pairing key is received from an unpaired server. A determination is made regarding whether to approve or reject the pairing request. Making the determination comprises attempting to validate the pairing key in the pairing request. Responsive to determining to approve the pairing request: the unpaired server is notified that the unpaired server is now a managed server; a description of the managed server is generated, wherein the managed server description includes a set of one or more labels that describe the managed server; management instructions are generated for the managed server based on the managed server description and based on an administrative domain-wide management policy that
(Continued)

includes a rule that refers to managed servers using a label; and the management instructions are sent to the managed server.

20 Claims, 5 Drawing Sheets

Related U.S. Application Data (60) Provisional application No. 61/899,468, filed on Nov. 4, 2013.

(51) Int. Cl.
*H04L 9/06* (2006.01)
*H04L 29/08* (2006.01)

(52) U.S. Cl.
CPC .............. *H04L 63/06* (2013.01); *H04L 63/08* (2013.01); *H04L 63/083* (2013.01); *H04L 63/10* (2013.01); *H04L 63/102* (2013.01); *H04L 63/20* (2013.01); *H04L 67/303* (2013.01); *H04L 63/02* (2013.01); *H04L 63/0227* (2013.01)

(56) References Cited

U.S. PATENT DOCUMENTS

| | | | |
|---|---|---|---|
| 7,644,414 | B2 | 1/2010 | Smith et al. |
| 7,826,381 | B1 | 11/2010 | Kastuar et al. |
| 2003/0236867 | A1 | 12/2003 | Natsuno et al. |
| 2004/0039803 | A1 | 2/2004 | Law |
| 2004/0199792 | A1 | 10/2004 | Tan et al. |
| 2005/0005120 | A1 | 1/2005 | Kahn et al. |
| 2005/0120202 | A1 | 6/2005 | Cuellar et al. |
| 2007/0100967 | A1 | 5/2007 | Smith et al. |
| 2007/0282986 | A1* | 12/2007 | Childress ............... G06Q 10/06 709/223 |
| 2008/0060080 | A1 | 3/2008 | Lim |
| 2008/0195755 | A1 | 8/2008 | Lu et al. |
| 2009/0165078 | A1 | 6/2009 | Samudrala et al. |
| 2010/0050229 | A1 | 2/2010 | Overby |
| 2010/0058340 | A1 | 3/2010 | Kamada |
| 2011/0078309 | A1 | 3/2011 | Bloch et al. |
| 2011/0209195 | A1 | 8/2011 | Kennedy |
| 2011/0252240 | A1 | 10/2011 | Freedman et al. |
| 2011/0296005 | A1 | 12/2011 | Labovitz et al. |
| 2011/0314168 | A1 | 12/2011 | Bathiche et al. |
| 2012/0023546 | A1 | 1/2012 | Kartha et al. |
| 2012/0084342 | A1* | 4/2012 | Brown ............... H04N 21/2543 709/203 |
| 2012/0131164 | A1 | 5/2012 | Bryan et al. |
| 2012/0155290 | A1 | 6/2012 | Dantressangle et al. |
| 2012/0210425 | A1 | 8/2012 | Porras et al. |
| 2013/0044763 | A1 | 2/2013 | Koponen et al. |
| 2014/0195678 | A1 | 7/2014 | Longhorn |
| 2014/0310408 | A1 | 10/2014 | Kirner et al. |
| 2014/0310415 | A1 | 10/2014 | Kirner et al. |
| 2014/0373091 | A1 | 12/2014 | Kirner et al. |
| 2015/0128211 | A1 | 5/2015 | Kirner et al. |
| 2015/0128212 | A1 | 5/2015 | Scott et al. |

FOREIGN PATENT DOCUMENTS

| | | |
|---|---|---|
| TW | I256001 | 6/2006 |
| WO | WO 2004/047407 A1 | 6/2004 |
| WO | WO 2007/027658 A2 | 3/2007 |
| WO | WO 2013/020126 A1 | 2/2013 |

OTHER PUBLICATIONS

"Daemon (Computing)", Last updated Feb. 10, 2015, Wikipedia, the Free Encyclopedia, 4 pages [Online], [Retrieved Mar. 9, 2015],Retrieved from the Internet, < http://en.wikipedia.org/wiki/Daemon.sub.--(computing)>.

"Hypervisor", Last updated Mar. 7, 2015, Wikipedia, the Free Encyclopedia, 8 pages, [Online], [Retrieved Mar. 9, 2015], Retrieved from the Internet, < http://en.wikipedia.org/wiki/Hypervisor >.

International Search Report and Written Opinion for International Application No. PCT/US2014/062954, dated Feb. 18, 2015, 18 pages.

"JSON", Last updated Mar. 9, 2015, Wikipedia, the Free Encyclopedia, 16 pages, [Online], [Retrieved from the Internet Mar. 9, 2015], Retrieved from the Internet< http://en.wikipedia.org/wiki/JSON >.

Office Action for ROC (Taiwan) Patent Application No. 103138236, dated May 16, 2016, 8 Pages (With Concise Explanation of Relevance).

"OSI Model", Last updated Mar. 9, 2015, Wikipedia, the Free Encyclopedia, 9 pages, [Online], [Retrieved Mar. 9, 2015], Retrieved from the Internet , < http://en.wikipedia.org/wiki/OSI.sub.--model >.

PCT International Search Report and Written Opinion for PCT/US14/54505, dated Jun. 26, 2015, 15 Pages.

PCT International Search Report and Written Opinion for PCT/US14/63239, dated Mar. 26, 2015, 22 Pages.

PCT International Search Report and Written Opinion for PCT/US14/63748, dated Mar. 11, 2015, 16 Pages.

"Representational State Transfer", Last updated Mar. 7, 2015, Wikipedia, The Free Encyclopedia, 5 pages, [Online], [Retrieved Mar. 9, 2015], Retrieved from the Internet, <http://en.wikipedia.org/wiki/Representational.sub.--state.sub.--trans-fer >.

"Snort.Org", 2015, Cisco and/or its Affiliates, 7 pages, [Online], [Retrieved Mar. 9, 2015], Retrieved from the Internet < https://www.snort.org/ >.

"The Open Information Security Foundation—Suricata Downloads", OSF Open Information Security Foundation, 6 pages [Online], [Retrieved Mar. 9, 2015], Retrieved from the Internet, <http://www.openinfosecfoundation.org/index.php/download-suricata >.

United States Office Action, U.S. Appl. No. 14/527,372, dated Dec. 4, 2015, 11 pages.

\* cited by examiner

FIG. 5 ion Ser. No. 14/527,372, filed on Oct. 29, 2014, now U.S. Pat. No. 9,397,892, which claims the benefit of U.S. Provisional Application No. 61/899,468, filed Nov. 4, 2013, the contents of each of which is incorporated by reference in its entirety. This application is related to U.S. application Ser. No. 14/249,128, filed Apr. 9, 2014, now U.S. Pat. No. 9,882,783, which is incorporated by reference herein in its entirety. This application is related to U.S. application Ser. No. 14/249,145, filed Apr. 9, 2014, now U.S. Pat. No. 9,942,102, which is incorporated by reference herein in its entirety.

MANAGING SERVERS BASED ON PAIRING KEYS TO IMPLEMENT AN ADMINISTRATIVE DOMAIN-WIDE POLICY

RELATED APPLICATIONS

This application is a continuation of U.S. application Ser. No. 14/527,372, filed on Oct. 29, 2014, now U.S. Pat. No. 9,397,892, which claims the benefit of U.S. Provisional Application No. 61/899,468, filed Nov. 4, 2013, the contents of each of which is incorporated by reference in its entirety. This application is related to U.S. application Ser. No. 14/249,128, filed Apr. 9, 2014, now U.S. Pat. No. 9,882,783, which is incorporated by reference herein in its entirety. This application is related to U.S. application Ser. No. 14/249,145, filed Apr. 9, 2014, now U.S. Pat. No. 9,942,102, which is incorporated by reference herein in its entirety.

BACKGROUND

1. Technical Field

The subject matter described herein generally relates to the field of managing servers (physical or virtual) of an administrative domain and, in particular, to managing servers according to an administrative domain-wide policy that adheres to a logical multi-dimensional label-based policy model.

2. Background Information

Servers (physical or virtual) of an administrative domain are managed according to a policy. For example, a security policy might specify access control and/or secure connectivity, while a resource-usage policy might specify usage of the administrative domain's computing resources (e.g., disks and/or peripherals). Conventional policies reference physical devices and are expressed in terms of low-level constructs such as Internet Protocol (IP) addresses, IP address ranges, subnetworks, and network interfaces. These low-level constructs make it difficult to write a fine-grained policy in an abstract and natural way.

SUMMARY

The above and other issues are addressed by a method, non-transitory computer-readable storage medium, and system for pairing a server. An embodiment of the method comprises receiving, from an unpaired server, a pairing request that includes a pairing key. The method further comprises determining whether to approve or reject the pairing request, comprising attempting to validate the pairing key in the pairing request. The method further comprises responsive to determining to approve the pairing request: notifying the unpaired server that the unpaired server is now a managed server; generating a description of the managed server, wherein the managed server description includes a set of one or more labels that describe the managed server; generating management instructions for the managed server based on the managed server description and based on an administrative domain-wide management policy that includes a rule that refers to managed servers using a label; and sending the management instructions to the managed server.

An embodiment of the medium stores computer program modules executable to perform steps. The steps comprise receiving, from an unpaired server, a pairing request that includes a pairing key. The steps further comprise determining whether to approve or reject the pairing request, comprising attempting to validate the pairing key in the pairing request. The steps further comprise responsive to determining to approve the pairing request: notifying the unpaired server that the unpaired server is now a managed server; generating a description of the managed server, wherein the managed server description includes a set of one or more labels that describe the managed server; generating management instructions for the managed server based on the managed server description and based on an administrative domain-wide management policy that includes a rule that refers to managed servers using a label; and sending the management instructions to the managed server.

An embodiment of the system comprises a non-transitory computer-readable storage medium storing computer program modules executable to perform steps. The steps comprise receiving, from an unpaired server, a pairing request that includes a pairing key. The steps further comprise determining whether to approve or reject the pairing request, comprising attempting to validate the pairing key in the pairing request. The steps further comprise responsive to determining to approve the pairing request: notifying the unpaired server that the unpaired server is now a managed server; generating a description of the managed server, wherein the managed server description includes a set of one or more labels that describe the managed server; generating management instructions for the managed server based on the managed server description and based on an administrative domain-wide management policy that includes a rule that refers to managed servers using a label; and sending the management instructions to the managed server.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
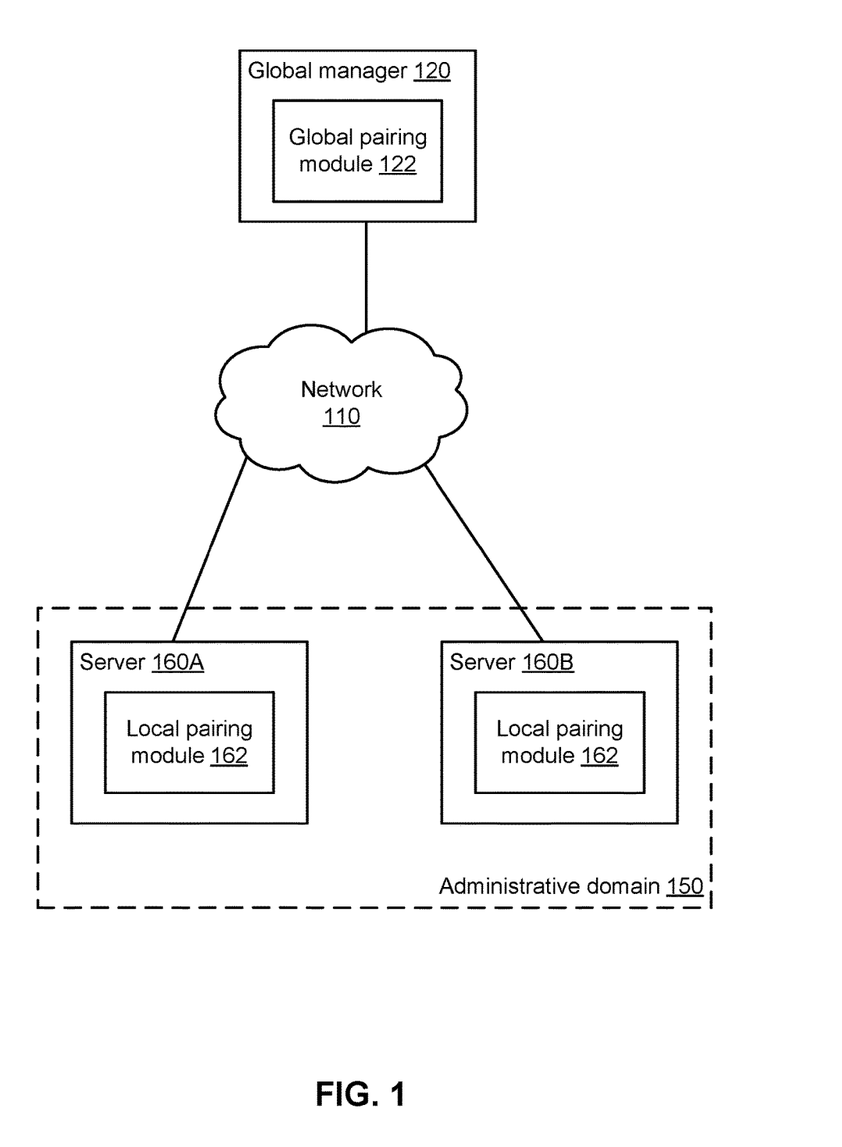
FIG. 1 is a high-level block diagram illustrating an environment for pairing servers (physical or virtual) of an administrative domain, according to one embodiment.

FIG. 1 is a high-level block diagram illustrating an environment 100 for pairing servers (physical or virtual) 160 of an administrative domain 150, according to one embodiment. The administrative domain 150 can correspond to an enterprise such as, for example, a service provider, a corporation, a university, or a government agency. The environment 100 may be maintained by the enterprise itself or by a third party (e.g., a second enterprise) that helps the enterprise pair its servers 160. As shown, the environment 100 includes a network 110, a global manager 120, and multiple servers 160. The multiple servers 160 are associated with the administrative domain 150. For example, they are operated by the enterprise or by a third party (e.g., a public cloud service provider) on behalf of the enterprise. While one global manager 120 and two servers 160 are shown in the embodiment depicted in FIG. 1 for clarity, other embodiments can have different numbers of global managers 120 and/or servers 160.

The network 110 represents the communication pathway between the global manager 120 and the servers 160. In one embodiment, the network 110 uses standard communications technologies and/or protocols and can include the Internet. In another embodiment, the entities on the network 110 can use custom and/or dedicated data communications technologies.

A server 160 is a machine (physical or virtual). In one embodiment, a server is a user-space instance of a virtual server (sometimes referred to as a container, virtualization engine, virtual private server, or jail) according to operating system-level virtualization, which is a server virtualization method where the kernel of an operating system enables multiple isolated user-space instances, instead of only one instance. If a server 160 is a physical machine, then the server is a computer or set of computers. If a server 160 is a virtual machine, then the server executes on a computer or set of computers.

Initially, a server 160 is "unpaired" relative to the global manager 120. The server 160 executes a local pairing module 162 to initiate a pairing process. If the pairing process is successful, then the server 160 changes from being unpaired to being "managed." The local pairing module 162 is further described below with reference to FIG. 4.

A managed server 130 is shown in FIG. 1 of U.S. application Ser. No. 14/249,128, filed Apr. 9, 2014 (the "'128 Application"), which is incorporated by reference herein in its entirety. A managed server 130 implements an administrative domain-wide management policy, while a server 160 that is unpaired does not implement the administrative domain-wide management policy. An administrative domain-wide management policy 330 (shown in FIG. 3 of the '128 Application) specifies whether and/or how entities associated with the administrative domain 150 are allowed to access (or be accessed by) other entities or otherwise consume (or provide) services. For example, the administrative domain-wide management policy 330 specifies security or resource usage. A security policy might specify access control, secure connectivity, disk encryption, and/or control of executable processes, while a resource-usage policy might specify usage of the administrative domain's computing resources (e.g., disks, peripherals, and/or bandwidth).

A managed server 130 includes a management module 132, a management module configuration 134, and a policy implementation module 136 (shown in FIG. 1 of the '128 Application). The management module 132 implements the administrative domain-wide management policy 330. For example, in the case of security, the management module 132 can be a low-level network or security engine such as an operating system-level firewall, an Internet Protocol security (IPsec) engine, or a network traffic filtering engine (e.g., based on the Windows Filtering Platform (WFP) development platform). In the case of resource usage, the management module 132 can be a disk-usage engine or a peripheral-usage engine.

The management module configuration 134 affects the operation of the management module 132. For example, in the case of security, the management module configuration 134 can be access control rules applied by a firewall, secure connectivity policies applied by an IPsec engine (e.g., embodied as iptables entries and ipset entries in the Linux operating system), or filtering rules applied by a filtering engine. In the case of resource usage, the management module configuration 134 can be disk-usage policies applied by a disk-usage engine or peripheral-usage policies applied by a peripheral-usage engine.

The policy implementation module 136 generates the management module configuration 134 based on a) management instructions received from the global manager 120 and b) the state of the managed server 130. The management instructions are generated based, in part, on the administrative domain-wide management policy 330. The management module configuration 134 generated by the policy implementation module 136 implements that administrative domain-wide management policy 330 (to the extent that the policy concerns the managed server 130). This two-step process (generating management instructions and generating the management module configuration 134) is referred to as "instantiating" a management policy. The policy implementation module 136 also monitors the local state of the managed server 130 and sends local state information to the global manager 120.

In one embodiment, the policy implementation module 136 is part of a larger proprietary module (not shown). The proprietary module is loaded onto a server 160 that already has a management module 132, in preparation for the server changing from being unpaired to being managed. In one embodiment, the proprietary module also includes the local pairing module 162.

The global manager 120 is a computer (or set of computers). The global manager 120 executes a global pairing module 122 to perform a pairing process for a server 160. If the pairing process is successful, then the server 160 changes from being unpaired to being managed. The global pairing module 122 is further described below with reference to FIGS. 3 and 5.

The global manager 120 also generates management instructions for managed servers 130 and sends the generated management instructions to the servers. The management instructions are generated based on a) the state of the administrative domain's computer network infrastructure 320 (shown in FIG. 3 of the '128 Application) and b) an administrative domain-wide management policy 330. The state of the administrative domain's computer network infrastructure 320 includes descriptions of managed servers 130 and (optionally) descriptions of unmanaged devices 140 (shown in FIG. 1 of the '128 Application). The global manager 120 also processes local state information received from managed servers 130.

The administrative domain-wide management policy 330 is based on a logical management model that can reference managed servers 130 based on their high-level characteristics, referred to herein as "labels." A label is a pair that includes a "dimension" (a high-level characteristic) and a "value" (the value of that high-level characteristic). A management policy constructed in this multi-dimensional space is more expressive than a management policy constructed according to a single-characteristic network/IP address-based policy model. In particular, expressing management policy using the higher-level abstractions of "labels" enables people to better understand, visualize, and modify management policy.

The logical management model (e.g., the number and types of dimensions available and those dimensions' possible values) is configurable. In one embodiment, the logical management model includes the following dimensions and values, as shown in Table 1:

TABLE 1

Example of logical management model

| Dimension | Meaning (M), Values (V) |
| --- | --- |
| Role | M: The role of the managed server within the administrative domain.<br>V: web, API, database |
| Environment | M: The lifecycle stage of the managed server.<br>V: production, staging, development |
| Application | M: The logical application (higher-level grouping of managed servers) to which the managed server belongs.<br>V: trading, human resources |
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |

The logical management model enables multiple managed servers 130 to be grouped together by specifying one or more labels (referred to herein as a "label set") that describe all of the managed servers 130 in the group. A label set includes either zero values or one value for a dimension in the logical management model. A label set need not include labels for all dimensions in the logical management model. In this way, the logical management model enables the segmentation and separation of an administrative domain's managed servers 130 and the creation of arbitrary groupings of managed servers. The logical management model also allows for a single managed server 130 to exist in multiple overlapping sets (i.e., multiple overlapping groups of managed servers). The logical management model does not limit the single managed server 130 to existing in a hierarchy of nested sets.

For example, in the case of security, segmentation can be used with access control policies to define groups of managed servers 130 that are subject to particular policies. Similarly, segmentation can be used with secure connectivity policies to define groups of managed servers 130 and the policies that apply to intra-group communications and inter-group communications. So, communications among a first group of managed servers 130 (specified by a first label set) can be restricted to a first secure connection setting (e.g., secure connection not required), and communications between the first group of managed servers and a second group of managed servers (specified by a second label set) can be restricted to a second secure connection setting (e.g., IPsec Encapsulating Security Payload (ESP)/Authentication Header (AH) Advanced Encryption Standard (AES)/Secure Hash Algorithm-2 (SHA-2)).

Each managed server 130 in the environment 100 implements the administrative domain-wide management policy 330 (to the extent that the policy concerns the managed server). As a result, the administrative domain-wide management policy 330 is applied in a distributed fashion throughout the administrative domain 150, and there are no choke points. Also, the administrative domain-wide management policy 330 is applied at the logical level independent of the administrative domain's physical network topology and network addressing schemes.

Figure 2:
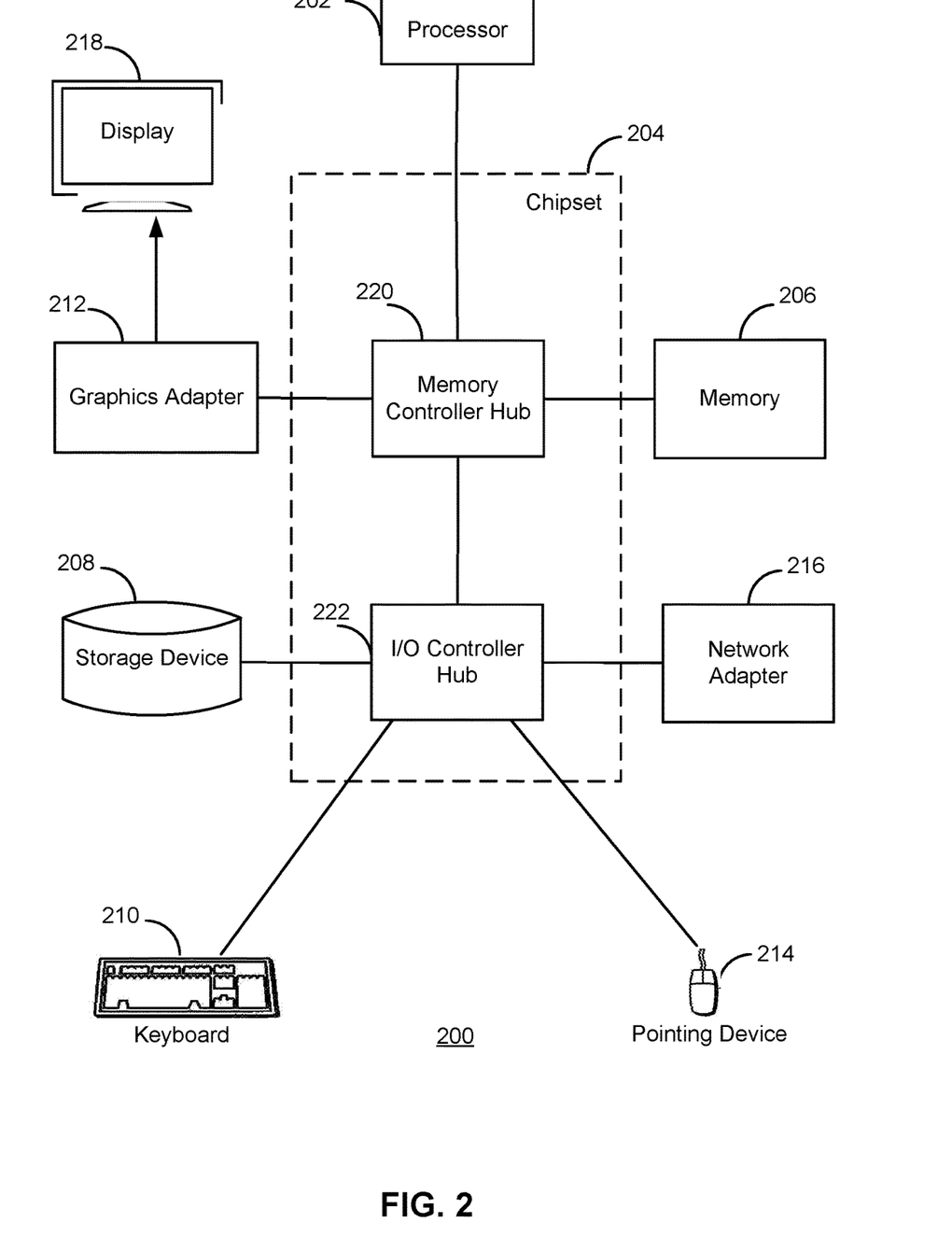
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the global manager 120 and/or the server 160 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
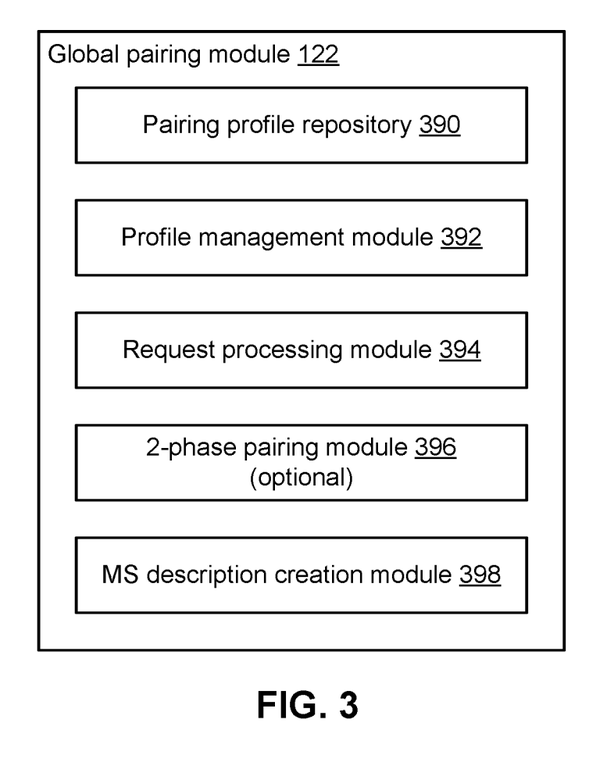
FIG. 3 is a high-level block diagram illustrating a detailed view of a global pairing module of a global manager, according to one embodiment.

FIG. 3 is a high-level block diagram illustrating a detailed view of a global pairing module 122 of a global manager 120, according to one embodiment. The global pairing module 122 includes a pairing profile repository 390, a profile management module 392, a request processing module 394, a 2-phase pairing module 396 (optional), and a managed server (MS) description creation module 398. The pairing profile repository 390 stores one or more pairing profiles. In one embodiment, a pairing profile includes pairing key-related information, label-related information, configured characteristic-related information, server state-related information, and multifactor authentication-related information.

Pairing key-related information—A pairing profile includes one or more unique pairing keys (and/or hash values of the one or more unique pairing keys). In one embodiment, a pairing key is a long alphanumeric string (e.g., at least 50 characters) and can be exhausted, can expire, or can be revoked. If a pairing key is exhausted, expired, or revoked, then the pairing key is deleted from the profile or marked as invalid (e.g., exhausted, expired, or revoked). A "maximum key usages" number indicates how many times a single pairing key can be used (e.g., how many unpaired servers 160 can successfully pair using the same pairing key). A pairing key is exhausted after the maximum key usages number is reached. A pairing profile maintains, over time, a count per pairing key that indicates how many times that key has been used for pairing. In one embodiment, the maximum key usages number can be infinite. A "key lifespan" time period indicates how long a pairing key is valid. A pairing key expires after the key lifespan time period elapses. In one embodiment, the key lifespan time period can be infinite.

Label-related information—As explained above, a "label" is a pair that includes a dimension (a high-level characteristic of a managed server 130) and a value (the value of that high-level characteristic) and can be used to reference a managed server based on the server's high-level characteristics. A pairing profile includes zero or more default labels. A default label can concern any dimension, such as Role, Environment, Application, Line of Business, or Location. A default label can be "locked" or "unlocked." If a default label is locked, then the value of that dimension cannot be changed by an unpaired server 160 (e.g., by the unpaired server including in a pairing request a requested label that has a different value than the locked default label for the same dimension).

Configured characteristic-related information—A "configured characteristic" (CC) is a key-value pair associated with a managed server 130, where the value can be any type of information. For example, a CC can have an "operating system" key and a value that indicates which operating system is executing on the managed server 130. As another example, a CC can have a "visibility mode" key and a value that indicates which local state information is sent from the managed server 130 to the global manager 120. As yet another example, a CC can have a key that represents any user-defined property of a managed server 130 and a value that indicates the value of that property. A CC is used in conjunction with a condition portion of a rule within an administrative domain-wide management policy 330.

A pairing profile includes zero or more default configured characteristics (CCs). A default CC can be "locked" or "unlocked." If a default CC is locked, then the value of that CC cannot be changed by an unpaired server 160 (e.g., by the unpaired server including in a pairing request a requested CC that has a different value than the locked default CC for the same key).

Server state-related information—A server state indicates to what extent a server implements an administrative domain-wide management policy 330. In one embodiment, a server state can be Unmanaged, Build, Test, or Enforce. (Build, Test, and Enforce are different types of "managed" server states.) If the server state is Unmanaged, then the server is paired, but the global manager 120 must complete an additional workflow ("2-phase pairing") in order to change the server state to one of the managed server states. If the server state is Build, then the managed server 130 receives management instructions from the global manager 120 and allows all activities. If the server state is Test, then the managed server 130 receives management instructions from the global manager 120, allows all activities, and either a) sends alerts to the global manager regarding activities that violate the administrative domain-wide management policy 330 or b) reports all activities to the global manager which then generates alerts regarding activities that violate the management policy. If the server state is Enforce, then the managed server 130 receives management instructions from the global manager 120, enforces the administrative domain-wide management policy 330 (i.e., blocks an activity if the activity violates the management policy), and either a) sends alerts to the global manager regarding activities that violate the management policy or b) reports all activities to the global manager which then generates alerts regarding activities that violate the management policy.

A pairing profile includes one default server state. The default server state can be "locked" or "unlocked." If the default server state is locked, then the value of that server state cannot be changed by an unpaired server 160 (e.g., by the unpaired server including in a pairing request a requested server state that has a different value than the locked default server state).

Multifactor authentication-related information—A pairing profile includes zero or more multifactor authentication (MFA) tests. An MFA test is an additional test that the global manager 120 performs using additional information about a server 160. If a server 160 fails an MFA test, then the global manager 120 rejects the server's pairing request. The additional information used in an MFA test is present in the server's pairing request or determined by the global manager 120. Additional information and MFA tests include, for example:

a) geographical location of server—The global manager 120 can test the geographical location of the server 160 for various values. The global manager 120 can determine the server's geographical location based on the server's IP address or data center (in conjunction with an internal database or other configuration information known to the global manager). The server's IP address and data center can be present in the server's pairing request or determined by the global manager 120 (e.g., based on a source IP address where the pairing request came from).

b) operating system of server—The global manager 120 can test the operating system of the server 160 for various values. The server's operating system can be present in the server's pairing request.

c) service information of server—The global manager 120 can test the service information of the server 160 for various values. "Service information" includes, for example, process information and/or package information. Process information includes, for example, names of processes that the server 160 is running, which network ports and network interfaces those processes are listening on, which users initiated those processes, configurations of those processes, command-line launch arguments of those processes, and dependencies of those processes (e.g., shared objects to which those processes link). (Those processes correspond to the server 160 providing a service or using a service.) Package information includes, for example, which packages (executables, libraries, or other components) are installed on the server 160, the versions of those packages, the configurations of those packages, and the hash values of those packages. The server's service information can be present in the server's pairing request.

d) cloud service provider of server—The server's pairing request includes an instance identifier (ID) of the server 160. The global manager 120 can determine whether this instance ID belongs to the customer account that the server 160 is requesting to pair into. (The requested customer account was configured in the global manager 120 before the pairing request was received.) For example, the global manager 120 determines whether the instance ID corresponds to a valid account at a cloud service provider (Amazon Web Services, Amazon Virtual Private Cloud, etc.) by checking an external database.

e) threat status of server—The global manager 120 can compare the server's IP address to a "threat feed" or list of bad actors. In one embodiment, the feed or list was generated by the global manager 120 based on information received from various managed servers 130. In another embodiment, the feed or list came from a third party, including a customer of the global manager 120. For example, the feed or list can come from an external database or be configured within a customer's global manager account. The server's IP address can be present in the server's pairing request or determined by the global manager 120 (e.g., based on a source IP address where the pairing request came from).

The profile management module 392 enables a pairing profile to be created, modified, and/or used to distribute pairing information. In one embodiment, the profile management module 392 offers this functionality via a graphical user interface (GUI) and/or an application programming interface (API). Regarding creation, the profile management module 392 creates a pairing profile and stores the pairing profile in the pairing profile repository 390. The profile management module 392 also generates a pairing key (e.g., in response to activation of a "Generate Key" button in the GUI or calling of an API function). After the profile management module 392 generates a pairing key, the profile management module stores the key and/or a hash value of the key in the pairing profile.

Regarding modification, the profile management module 392 modifies an existing pairing profile. For example, the profile management module 392 modifies pairing key-related information (e.g., maximum key usages number, key lifespan time period, or revocation status), label-related information (e.g., dimension, value, or lock status), configured characteristic-related information (e.g., key, value, or lock status), server state-related information (e.g., value or lock status), or MFA-related information (e.g., an MFA test). In one embodiment, the profile management module 392 revokes a pairing key (e.g., in response to activation of a "Revoke" button in the GUI or calling of an API function).

Regarding distributing pairing information, the profile management module 392 sends pairing information to an unpaired server 160. The pairing information includes, for example, a pairing key (from a pairing profile) and a location of the global manager 120 (e.g., the global manager's IP address or domain name system (DNS) name). In one embodiment, the profile management module 392 sends the pairing information using out-of-band (OOB) communication. OOB communication is, for example, a web page that is served by the global manager 120, an email message, or a text message. The profile management module 392 can use an orchestration tool (e.g., Puppet Labs' Puppet software, Opscode's Chef software, or Ansible, Inc.'s Ansible software) to send the pairing information. In one embodiment, the profile management module 392 provides the user with instructions on how to use a pairing key to pair an unpaired server 160.

The request processing module 394 determines whether to approve or reject a pairing request. A pairing request includes a pairing key, zero or more requested labels, zero or more requested configured characteristics, zero or one requested server state, and (optionally) additional information for MFA testing purposes. Given the pairing key in the pairing request, the request processing module 394 attempts to identify a matching pairing profile from the pairing profile repository 390. For example, the request processing module 394 searches for a profile that includes a key (or key hash) that matches the key in the pairing request (or that key's hash). If no matching profile exists, then the pairing request key is invalid, and the request processing module 394 determines to reject the pairing request. If a matching profile does exist, then the request processing module 394 determines whether to approve or reject the pairing request based on key validation results, requested label results (optional), requested configured characteristic results (optional), requested server state results (optional), and/or multifactor authentication results (optional).

Regarding key validation results, the request processing module 394 attempts to further validate the pairing request key using the matching pairing profile. For example, the request processing module 394 determines whether the pairing request key has been exhausted (i.e., if the count for this key is less than the maximum key usage number, then the pairing request complies with the maximum key usages restriction). As another example, the request processing module 394 determines whether the pairing request key has expired (i.e., if the key lifespan time period has not elapsed, then the pairing request complies with the key lifespan restriction). As yet another example, the request processing module 394 determines whether the pairing request key has been revoked. If the pairing request key has not been exhausted, has not expired, and has not been revoked, then the key is valid.

Regarding requested label results (optional), the request processing module 394 determines that the matching pairing profile includes a "locked" default label and the pairing request includes a requested label for that same dimension. The request processing module 394 compares the requested label to the default label. If the value of the requested label differs from the value of the default label, then the pairing request does not comply with the default label lock restriction. In this situation, there are two options: the request processing module 394 approves the pairing request (but the conflicting requested label is not used in the managed server description) or the request processing module rejects the pairing request. The selection of an option is configurable. In one embodiment, a system administrator specifies which option to use, and the selected option is indicated in the pairing profile (to be used for all locked default labels or on a label-by-label basis).

Regarding requested configured characteristic results (optional), the request processing module 394 determines that the matching pairing profile includes a "locked" default configured characteristic (CC) and the pairing request includes a requested CC for that same key. The request processing module 394 compares the requested CC to the default CC. If the value of the requested CC differs from the value of the default CC, then the pairing request does not comply with the default CC lock restriction. In this situation, there are two options: the request processing module 394 approves the pairing request (but the conflicting requested CC is not used in the managed server description) or the request processing module rejects the pairing request. The selection of an option is configurable. In one embodiment, a system administrator specifies which option to use, and the selected option is indicated in the pairing profile (to be used for all locked default CCs or on a CC-by-CC basis).

Regarding requested server state results (optional), the request processing module 394 determines that the matching pairing profile includes a "locked" default server state and the pairing request includes a requested server state. The request processing module 394 compares the requested server state to the default server state. If the value of the requested server state differs from the value of the default server state, then the pairing request does not comply with the default server state lock restriction. In this situation, there are two options: the request processing module 394 approves the pairing request (but the conflicting requested server state is not used in the managed server description) or the request processing module rejects the pairing request. The selection of an option is configurable. In one embodiment, a system administrator specifies which option to use, and the selected option is indicated in the pairing profile.

Regarding multifactor authentication results (optional), the request processing module 394 determines that the matching pairing profile includes one or more MFA tests. The request processing module 394 performs the MFA tests using additional information about the server 160 that sent the pairing request. If the server 160 fails an MFA test, then the request processing module 394 rejects the server's pairing request. The additional information used in an MFA test is present in the server's pairing request or determined by the request processing module 394, as described above with respect to multifactor authentication-related information in a pairing profile.

In one embodiment, if the request processing module 394 determines to reject the pairing request, then the request processing module logs the rejection. For example, the request processing module 394 generates and stores a log entry that includes contents of the pairing request, a reason for rejecting the pairing request, and/or a timestamp indicating when the rejection occurred. The contents of the pairing request can be, for example, either the complete pairing request or a portion of the pairing request.

In one embodiment, if the request processing module 394 determines to approve the pairing request, then the request processing module: (optionally) completes an additional workflow ("2-phase pairing") in order to change the server state to one of the managed server states; generates a description of the newly-managed server; notifies the newly-managed server that the pairing was successful; and sends the managed server description to the global manager's administrative domain state update (ADSU) module 385 for further processing. Each of these steps will now be explained.

If appropriate, the request processing module 394 optionally determines that the matching pairing profile includes a default server state with a value of Unmanaged, and the default server state is locked. Due to the locked server state, after the request processing module 394 approves the pairing request, the server 160 has a server state of Unmanaged. The request processing module 394 executes the 2-phase pairing module 396 (optional) to complete an additional workflow ("2-phase pairing") in order to change the server state to one of the "managed" server states (e.g., Build, Test, or Enforce). The additional workflow completed by the 2-phase pairing module 396 includes reviewing the paired (but unmanaged) server 160, approving or denying the server's change to a managed server state, and changing the server to a managed server state if the change is approved. The reviewing is performed manually by a human or automatically (e.g., by an orchestration tool). The reviewing includes reviewing information about the paired-unmanaged server 160, accessing information in a separate system (e.g., a third-party system), performing a test using the paired-unmanaged server's information and the accessed information, and changing the server to a managed server state if the server passes the test.

In one embodiment, the test that is performed is similar to a multifactor authentication (MFA) test, described above in conjunction with the pairing profile repository 390. The 2-phase pairing module 396 is configured with a set of one or more tests that a customer wants to be performed during the pairing process. The 2-phase pairing module 396 is also configured with the server state that the server should be assigned, depending on whether the set of tests was passed or failed.

After the request processing module 394 successfully completes the 2-phase pairing (or skips 2-phase pairing entirely), the server 160 is paired and is considered to be a managed server 130. The request processing module 394 executes the managed server (MS) description creation module 398 to generate a description of this newly-managed server 130. A description of a managed server 130 includes, for example, a unique identifier (UID), an online/offline indicator, network exposure information, service information, a server state, one or more labels that describe the managed server 130 (a label set), and one or more configured characteristics (optional). The global manager 120 uses a description of a managed server 130 (especially the label set portion) and an administrative domain-wide management policy 330 to generate management instructions for that managed server, as further described below.

The UID uniquely identifies the managed server 130. The MS description creation module 398 can use any technique to assign a UID to the managed server 130 (e.g., an incrementing number or obtaining a number from a Globally Unique ID (GUID) database). The MS description creation module 398 then populates the UID portion of the managed server description. The online/offline indicator indicates whether the managed server 130 is online or offline. Since the managed server 130 recently sent a pairing request, the managed server is online, and the MS description creation module 398 sets the online/offline indicator in the managed server description to "online."

The network exposure information concerns network interfaces of the managed server 130. In one embodiment, the network exposure information includes, for each of the managed server's network interfaces, an identifier of a "bidirectionally-reachable network" (BRN) to which the network interface is attached and zero or more IP addresses (and their subnets) that are used for operating within the BRN. A BRN is a set of subnets, within an organization or across organizations, where any node within the BRN can establish communication with any other node in the BRN. For example, all of the nodes in a BRN have unique IP addresses. In other words, a BRN does not contain any NATs. Network exposure information (e.g., a network interface's BRN identifier) can be used in conjunction with a condition portion of a rule within an administrative domain-wide management policy 330.

In another embodiment, the network exposure information includes routing information and/or whether the managed server 130 is behind a network address translator (NAT) (and, if it is behind a NAT, what type of NAT—1:1 or 1:N). The global manager 120 can determine whether a managed server 130 is behind a network address translator (NAT) (and, if it is behind a NAT, what type of NAT—1:1 or 1:N). For example, the global manager 120 determines whether a NAT exists between the global manager 120 and the managed server 130 by comparing (a) the server's IP address according to the TCP connection between the global manager and the server and (b) the server's IP address according to the local state information received from the server. If (a) and (b) differ, then a NAT exists between the global manager 120 and the managed server 130. If a NAT does exist, then the global manager 120 determines the type of NAT (1:1 or 1:N) by performing data center detection. For example, the global manager 120 identifies the server's data center by the data center's public IP address. (Alternatively, the managed server performs data center detection by querying information that is external to the server but inside the data center. The server then sends that information to the global manager as part of the local status.) Configuration information indicates which types of NATs are used by which data centers. If no NAT information is associated with a particular data center, then the global manager 120 assumes that the NAT type is 1:N. The MS description creation module 398 populates the network exposure information portion of the managed server description after the global manager 120 receives this information from the managed server 130.

The service information includes, for example, process information and/or package information. Process information includes, for example, names of processes that the managed server 130 is running, which network ports and network interfaces those processes are listening on, which users initiated those processes, configurations of those processes, command-line launch arguments of those processes, and dependencies of those processes (e.g., shared objects to which those processes link). (Those processes correspond to the managed server 130 providing a service or using a service.) Package information includes, for example, which packages (executables, libraries, or other components) are installed on the managed server 130, the versions of those packages, the configurations of those packages, and the hash values of those packages. The MS description creation module 398 populates the service information portion of the managed server description after the global manager 120 receives this information from the managed server 130.

As explained above, the server state indicates to what extent a server implements an administrative domain-wide management policy 330. Since the managed server description concerns a managed server 130, the server state is one of the "managed" server states (e.g., Build, Test, or Enforce). In one embodiment, the MS description creation module 398 populates the server state portion of the managed server description as follows: If the matching pairing profile includes a default server state that is locked, then the MS description creation module 398 populates the server state portion with the locked default server state value. If the matching profile does not include a locked default server state and the pairing request includes a requested server state, then the MS description creation module 398 populates the server state portion with the requested server state value. If the matching profile does not include a locked default server state and the pairing request does not include a requested server state, then the MS description creation module 398 populates the server state portion with the (unlocked) default server state value from the matching profile.

As explained above, a "label" is a pair that includes a dimension (a high-level characteristic of a managed server 130) and a value (the value of that high-level characteristic) and can be used to reference a managed server based on the server's high-level characteristics. In one embodiment, the MS description creation module 398 populates the label portion of the managed server description as follows: If the matching pairing profile includes a default label that is locked, then the MS description creation module 398 populates the label portion with the locked default label. If the pairing request includes a requested label whose value does not conflict with a locked default label, then the MS description creation module 398 populates the label portion with the requested label. If the matching profile includes a default label that is unlocked and whose value does not conflict with previously-populated labels, then the MS description creation module 398 populates the label portion with the (unlocked) default label from the matching profile.

As explained above, a "configured characteristic" (CC) is a key-value pair associated with a managed server 130, where the value can be any type of information. In one embodiment, the MS description creation module 398 populates the CC portion of the managed server description as follows: If the matching pairing profile includes a default CC that is locked, then the MS description creation module 398 populates the CC portion with the locked default CC. If the pairing request includes a requested CC whose value does not conflict with a locked default CC, then the MS description creation module 398 populates the CC portion with the requested CC. If the matching profile includes a default CC that is unlocked and whose value does not conflict with previously-populated CCs, then the MS description creation module 398 populates the CC portion with the (unlocked) default CC from the matching profile. Later, the global manager 120 can further populate the CC portion of the managed server description based on information received from the managed server 130.

After the request processing module 394 generates the managed server description, the request processing module notifies the newly-managed server 130 that the pairing was successful. In one embodiment, the notification states that the pairing was successful and includes an identifier and a token that are specific to the managed server 130.

After the request processing module 394 notifies the newly-managed server 130 that the pairing was successful, the request processing module sends the managed server description to an administrative domain state update module of the global manager 120 for further processing. An administrative domain state update (ADSU) module 385 (shown in FIG. 3 of the '128 Application): stores the managed server description in the administrative domain state 320; (optionally) analyzes the managed server description to determine additional information regarding the managed server 130 and stores that information in the description; causes the administrative domain's actor-sets to be updated (and sent to managed servers) based on the managed server description; and causes management instructions for the managed server to be generated (and sent to the managed server) based on the managed server description and the administrative domain-wide management policy 330. In one embodiment, the ADSU module 385 treats the newly-paired managed server 130 like a managed server that used to be offline but changed to be online.

As mentioned above, the global manager 120 uses a description of a managed server 130 (especially the label set portion) and an administrative domain-wide management policy 330 to generate management instructions for that managed server. The administrative domain-wide management policy 330 includes one or more rules. Broadly speaking, a "rule" specifies a relationship between one or more providers of a service and one or more consumers of that service. One of the rules included in the management policy 330 refers to a managed server 130 using a label. The global manager 120 uses the managed server descriptions in the administrative domain state 320 (especially the label set portions) to determine which rules refer to which managed servers 130. Rules are further described in the '128 Application.

Figure 4:
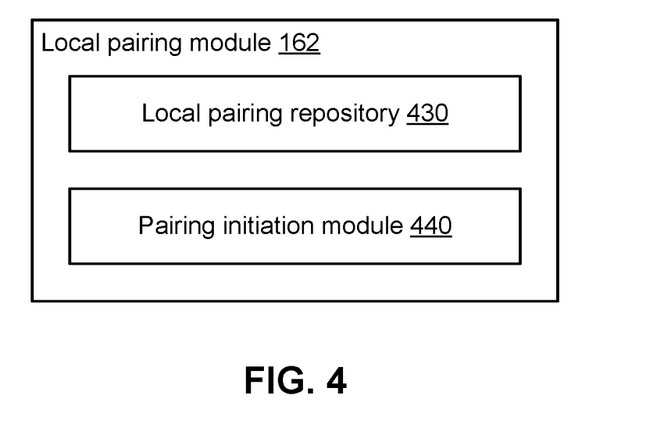
FIG. 4 is a high-level block diagram illustrating a detailed view of a local pairing module of a server, according to one embodiment.

FIG. 4 is a high-level block diagram illustrating a detailed view of a local pairing module 162 of a server 160, according to one embodiment. The local pairing module 162 includes a local pairing repository 430 and a pairing initiation module 440. The local pairing repository 430 stores information used to generate and/or send a pairing request. In one embodiment, the local pairing repository 430 stores a pairing key, a requested server state (optional), one or more requested labels (optional), one or more requested configured characteristics (optional), additional information regarding the server 160 (e.g., information that the global manager 120 can use to perform multifactor authentication) (optional), and/or a location of the global manager 120.

The pairing initiation module 440 receives pairing information from the global manager 120 and stores the information in the local pairing repository 430. The pairing information includes, for example, a pairing key and a location of the global manager 120. Recall that, in one embodiment, the global manager 120 sends the pairing information via out-of-band (OOB) communication, such as a web page that is served by the global manager, an email message, or a text message. The pairing information can be communicated to the pairing initiation module 440 by, for example, a user copying a pairing command (which includes the pairing information) from the OOB communication and pasting the command into a secure shell (SSH) window that communicates with the server 160.

The pairing initiation module 440 also generates a pairing request and sends the request to the global manager 120. For example, the pairing initiation module 440 generates a pairing request using information stored in the local pairing repository 430. A pairing request includes a pairing key, zero or more requested labels, zero or more requested configured characteristics, zero or one requested server state, and (optionally) additional information regarding the server 160 for multifactor authentication testing purposes. The pairing initiation module 440 sends the pairing request to the global manager 120 at the location stored in the local pairing repository 430. In one embodiment, the pairing initiation module's sending of the pairing request is caused by the pairing initiation module's execution of a pairing script. The pairing key is provided as a parameter to the pairing script. In one embodiment, the pairing initiation module 440 sends the pairing request to the global manager 120 using Hypertext Transfer Protocol Secure (HTTPS).

The pairing initiation module 440 also receives a notification from the global manager 120 regarding whether the pairing request was approved or rejected. After the pairing initiation module 440 receives a notification that the pairing request was approved, the pairing initiation module executes a local state update module of the managed server 130. A local state update (LSU) module 420 (shown in FIG. 4 of the '128 Application) monitors the managed server's local state and sends local state information to the global manager 120. In one embodiment, the global manager 120 can cause the managed server 130 to report information at any time.

Recall that the global manager's ADSU module 385 causes management instructions for a managed server 130 to be generated and sent to the managed server. The managed server 130 uses the received management instructions to generate a management module configuration 134 for its management module 132. When the management module 132 is configured according to the management module configuration 134, the management module implements the administrative domain-wide management policy 330 (to the extent that the management policy concerns the managed server 130). In one embodiment, the global manager 120 can cause the managed server 130 to download updated management instructions at any time.

Figure 5:
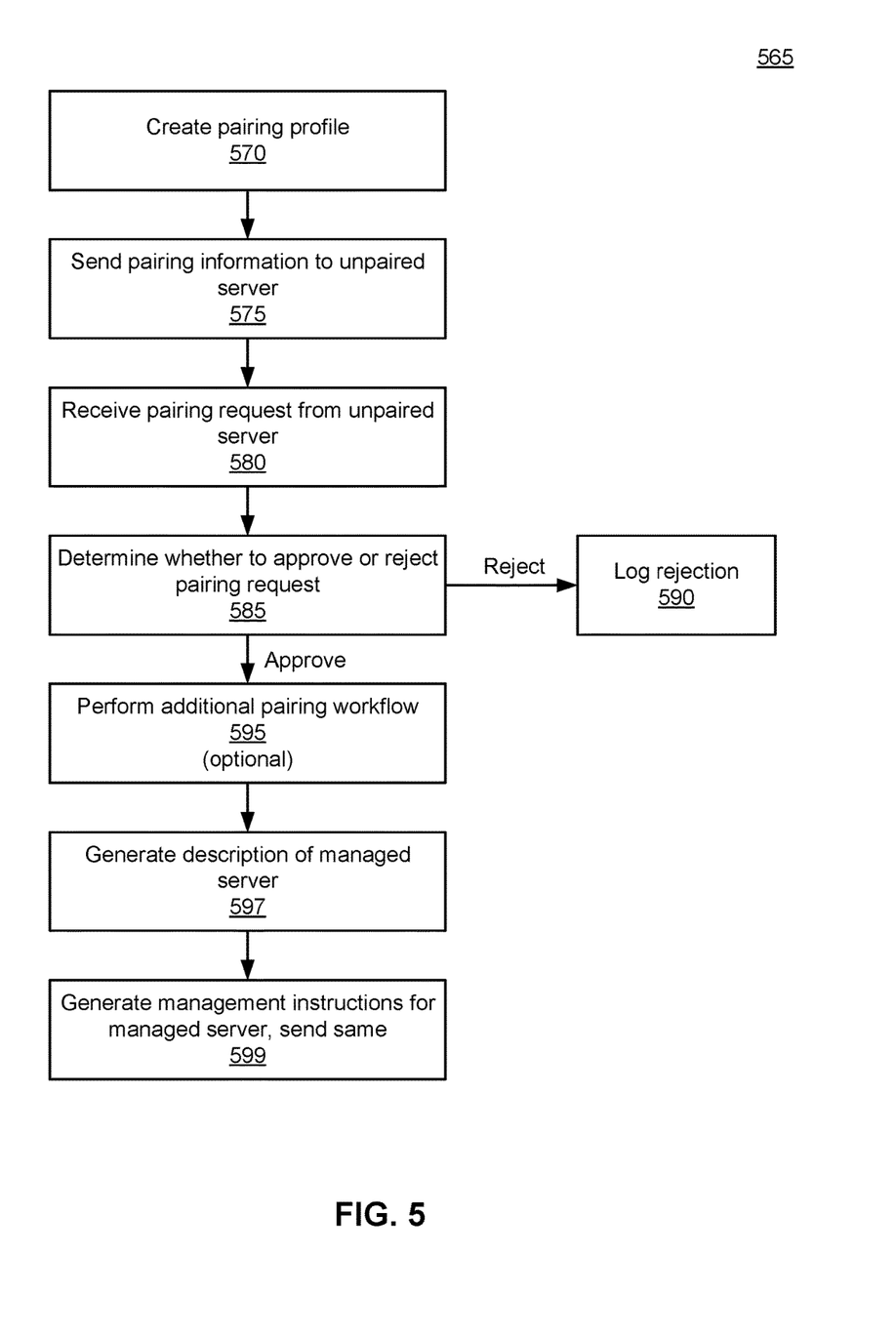
FIG. 5 is a flowchart illustrating a method of pairing a server, according to one embodiment.

FIG. 5 is a flowchart illustrating a method 565 of pairing a server 160, according to one embodiment. Other embodiments can perform the steps in different orders and can include different and/or additional steps. In addition, some or all of the steps can be performed by entities other than those shown in FIG. 3.

When the method 565 starts, the state of the administrative domain's computer network infrastructure 320 and an administrative domain-wide management policy 330 have already been stored in the repository 300 of the global manager 120 (shown in FIG. 3 of the '128 Application). At this point, the method 565 begins.

In step 570, a paring profile is created. For example, the profile management module 392 creates a pairing profile and stores the pairing profile in the pairing profile repository 390. In one embodiment, a pairing profile includes pairing key-related information, label-related information, configured characteristic-related information, server state-related information, and multifactor authentication-related information.

In step 575, pairing information is sent to an unpaired server 160. For example, the profile management module 392 sends pairing information to the unpaired server 160. The pairing information includes, for example, a pairing key and a location of the global manager 120.

In step 580, a pairing request is received from the unpaired server 160. For example, the global manager 120 receives the pairing request from the unpaired server 160. The pairing request includes a pairing key, zero or more requested labels, zero or more requested configured characteristics, zero or one requested server state, and (optionally) additional information for multifactor authentication testing purposes.

In step 585, a determination is made regarding whether to approve or reject the pairing request. For example, the request processing module 394 determines whether to approve or reject the pairing request based on a matching pairing profile, key validation results, requested label results (optional), requested configured characteristic results (optional), requested server state results (optional), and/or multifactor authentication results (optional).

If a determination is made to reject the pairing request, then the method proceeds to step 590, and the rejection is logged. For example, the request processing module 394 generates and stores a log entry that includes contents of the pairing request, a reason for rejecting the pairing request, and/or a timestamp indicating when the rejection occurred.

If a determination is made to approve the pairing request, then the method proceeds to step 595, and an additional pairing workflow is performed. For example, the request processing module 394 executes the 2-phase pairing module 396 to complete an additional workflow ("2-phase pairing") in order to change the server state from Unmanaged to one of the "managed" server states (e.g., Build, Test, or Enforce). The additional workflow completed by the 2-phase pairing module 396 includes reviewing the paired (but unmanaged) server 160, approving or denying the server's change to a managed server state, and changing the server to a managed server state if the change is approved. Step 595 is optional.

After the additional pairing workflow has been successfully completed (or skipped entirely), the server 160 is paired and is considered to be a managed server 130. In step 597, a description of the newly-managed server 130 is generated. For example, the request processing module 394 executes the managed server (MS) description creation module 398 to generate the managed server description. The managed server description includes, for example, a unique identifier (UID), an online/offline indicator, network exposure information, service information, a server state, one or more labels that describe the managed server 130 (a label set), and one or more configured characteristics (optional).

In step 599, management instructions are generated for the managed server 130 and sent to the managed server. For example, the request processing module 394 sends the managed server description to an administrative domain state update (ADSU) module 385 of the global manager 120 for further processing. The ADSU module 385 causes management instructions for the managed server to be generated and sent to the managed server based on the managed server description (especially the label set portion) and the administrative domain-wide management policy 330.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for pairing a server, comprising:
receiving, from the server, a pairing request that includes a pairing key and a requested label set;
identifying a matching pairing profile corresponding to the pairing key from a pairing profile repository;
determining, based on the pairing profile, whether the pairing key and the requested label set in the pairing request is valid;
responsive to determining that the pairing key and the requested label set in the pairing request is valid:
identifying, from an administrative domain-wide management policy, one or more rules applicable to the requested label set of the server, the one or more rules for controlling communications to and from the server;
generating management instructions for the server based on the one or more rules; and
sending the management instructions to the server.

2. The method of claim 1, further comprising:
receiving, from a second server, a second pairing request that includes a second pairing key;
searching a repository for a second pairing profile that includes the second pairing key in the second pairing request; and
responsive to failing to identify the pairing profile that includes the second pairing key that matches the second pairing key in the second pairing request:
determining that the second pairing key in the second pairing request is invalid; and
determining to reject the second pairing request.

3. The method of claim 1, further comprising:
receiving, from a second server, a second pairing request that includes a second pairing key;
responsive to identifying a second pairing profile that includes the second pairing in the pairing request, determining whether the second pairing key in the second pairing request has been exhausted, has expired, or has been revoked; and
responsive to determining that the second pairing key in the second pairing request has been exhausted, has expired, or has been revoked:
determining that the second pairing key in the second pairing request is invalid; and
determining to reject the second pairing request.

4. The method of claim 1, further comprising:
receiving, from a second server, a second pairing request that includes a second pairing key and that further includes information regarding the second server;
identifying a second pairing profile that includes the second pairing key in the second pairing request;
determining that the second pairing profile includes a test to perform using the information regarding the second server;
performing the test using the information regarding the second server; and
responsive to the test failing, determining to reject the second pairing request.

5. The method of claim 4, wherein the test concerns the second server's geographical location, operating system, service information, cloud service provider, or threat status.

6. The method of claim 1, further comprising prior to receiving, from the server, the pairing request that includes the pairing key:
generating the pairing key; and
storing the pairing key.

7. The method of claim 6, further comprising prior to receiving, from the server, the pairing request that includes the pairing key:
sending the pairing key to the server using out-of-band communication.

8. The method of claim 2, further comprising responsive to determining to reject the second pairing request:
generating a log entry that includes the second pairing request, a reason for rejecting the second pairing request, or a timestamp indicating when the rejection occurred; and
storing the log entry.

9. A non-transitory computer-readable storage medium storing computer program modules for pairing a server, the computer program modules executable to perform steps comprising:
receiving, from the server, a pairing request that includes a pairing key and a requested label set;
identifying a matching pairing profile corresponding to the pairing key from a pairing profile repository;
determining, based on the pairing profile, whether the pairing key and the requested label set in the pairing request is valid;
responsive to determining that the pairing key and the requested label set in the pairing request is valid:
identifying, from an administrative domain-wide management policy, one or more rules applicable to the requested label set of the server, the one or more rules for controlling communications to and from the server;
generating management instructions for the server based on the one or more rules; and
sending the management instructions to the server.

10. The non-transitory computer-readable storage medium of claim 9, the program modules further executable to perform steps including:
receiving, from a second server, a second pairing request that includes a second pairing key;
searching a repository for a second pairing profile that includes the second pairing key in the second pairing request; and
responsive to failing to identify the pairing profile that includes the second pairing key that matches the second pairing key in the second pairing request:
determining that the second pairing key in the second pairing request is invalid; and
determining to reject the second pairing request.

11. The non-transitory computer-readable storage medium of claim 9, the program modules further executable to perform steps including:
receiving, from a second server, a second pairing request that includes a second pairing key and that further includes information regarding the second server;
identifying a second pairing profile that include the second pairing key in the second pairing request;
determining that the second pairing profile includes a test to perform using the information regarding the second server;
performing the test using the information regarding the second server; and
responsive to the test failing, determining to reject the second pairing request.

12. The non-transitory computer-readable storage medium of claim 9, the computer program modules executable to perform steps comprising:
receiving, from a second server, a second pairing request that includes a second pairing key;
responsive to identifying a second pairing profile that includes the second pairing in the pairing request, determining whether the second pairing key in the second pairing request has been exhausted, has expired, or has been revoked; and
responsive to determining that the second pairing key in the second pairing request has been exhausted, has expired, or has been revoked:
determining that the second pairing key in the second pairing request is invalid; and
determining to reject the second pairing request.

13. The non-transitory computer-readable storage medium of claim 9, the program modules further executable to perform steps including:
prior to receiving, from the server, the pairing request that includes the pairing key:
generating the pairing key; and
storing the pairing key.

14. The non-transitory computer-readable storage medium of claim 9, the program modules further executable to perform steps including:
prior to receiving, from the server, the pairing request that includes the pairing key, sending the pairing key to the server using out-of-band communication.

15. The non-transitory computer-readable storage medium of claim 9, the program modules further executable to perform steps including:
responsive to determining to reject the second pairing request:
generating a log entry that includes the second pairing request, a reason for rejecting the second pairing request, or a timestamp indicating when the rejection occurred; and
storing the log entry.

16. A computer system for pairing a server, the system comprising:
a non-transitory computer-readable storage medium storing computer program modules executable to perform steps comprising:
receiving, from the server, a pairing request that includes a pairing key and a requested label set;
identifying a matching pairing profile corresponding to the pairing key from a pairing profile repository;
determining, based on the pairing profile, whether the pairing key and the requested label set in the pairing request is valid;
responsive to determining that the pairing key and the requested label set in the pairing request is valid:
identifying, from an administrative domain-wide management policy, one or more rules applicable to the requested label set of the server, the one or more rules for controlling communications to and from the server;
generating management instructions for the server based on the one or more rules; and
sending the management instructions to the server; and
a computer processor for executing the computer program modules.

17. The computer system of claim 16, the program modules further executable to perform steps including:
receiving, from a second server, a second pairing request that includes a second pairing key;
searching a repository for a second pairing profile that includes the second pairing key in the second pairing request; and
responsive to failing to identify the pairing profile that includes the second pairing key that matches the second pairing key in the second pairing request:
determining that the second pairing key in the second pairing request is invalid; and
determining to reject the second pairing request.

18. The computer system of claim 16, the program modules further executable to perform steps including:
receiving, from a second server, a second pairing request that includes a second pairing key and that further includes information regarding the second server;
identifying a second pairing profile that includes the second pairing key in the second pairing request;
determining that the second pairing profile includes a test to perform using the information regarding the second server;
performing the test using the information regarding the second server; and
responsive to the test failing, determining to reject the second pairing request.

19. The computer system of claim 16, the computer program modules executable to perform steps comprising:
receiving, from a second server, a second pairing request that includes a second pairing key;
responsive to identifying a second pairing profile that includes the second pairing in the pairing request, determining whether the second pairing key in the second pairing request has been exhausted, has expired, or has been revoked; and
responsive to determining that the second pairing key in the second pairing request has been exhausted, has expired, or has been revoked:
determining that the second pairing key in the second pairing request is invalid; and
determining to reject the second pairing request.

20. The computer system of claim 16, the program modules further executable to perform steps including:
prior to receiving, from the server, the pairing request that includes the pairing key:
generating the pairing key; and
storing the pairing key.

* * * * *